(12) United States Patent
Asada

(10) Patent No.: US 7,183,750 B2
(45) Date of Patent: Feb. 27, 2007

(54) VEHICLE POWER-GENERATION CONTROL UNIT AND VEHICLE POWER-GENERATION CONTROL SYSTEM

(75) Inventor: Tadatoshi Asada, Anjo (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/239,151

(22) Filed: Sep. 30, 2005

(65) Prior Publication Data

US 2006/0082347 A1 Apr. 20, 2006

(30) Foreign Application Priority Data

Oct. 15, 2004 (JP) ............................. 2004-300849

(51) Int. Cl.
- *H02P 9/10* (2006.01)
- *H02P 5/20* (2006.01)
- *H02H 7/06* (2006.01)
- *H02K 23/52* (2006.01)

(52) U.S. Cl. ............................. 322/59; 322/19; 290/46; 318/140

(58) Field of Classification Search .................. 322/19, 322/59; 290/46; 318/140
See application file for complete search history.

(56) References Cited

U.S. PATENT DOCUMENTS

| | | | | | |
|---|---|---|---|---|---|
| 3,902,073 A | * | 8/1975 | Lafuze | ........................ | 290/46 |
| 3,908,130 A | * | 9/1975 | Lafuze | ........................ | 290/46 |
| 3,937,974 A | * | 2/1976 | Lafuze | ........................ | 290/46 |
| 4,326,159 A | * | 4/1982 | Aotsu et al. | .................. | 322/19 |
| 4,481,459 A | * | 11/1984 | Mehl et al. | .................... | 322/10 |
| 5,488,286 A | * | 1/1996 | Rozman et al. | ............... | 322/10 |
| 5,497,069 A | * | 3/1996 | Shriver et al. | ................. | 322/19 |
| 6,051,941 A | * | 4/2000 | Sudhoff et al. | ............. | 318/140 |
| 6,137,247 A | | 10/2000 | Maehara et al. | ........... | 318/140 |
| 6,252,331 B1 | * | 6/2001 | Mildice et al. | ............. | 310/263 |
| 6,339,316 B1 | * | 1/2002 | Eguchi et al. | ................ | 322/59 |
| 6,359,414 B1 | * | 3/2002 | Nickel | ........................ | 318/701 |
| 6,525,502 B1 | * | 2/2003 | Piedl et al. | ................. | 318/605 |
| 6,525,504 B1 | * | 2/2003 | Nygren et al. | ............. | 318/700 |
| 6,819,087 B2 | * | 11/2004 | Delmerico et al. | ........... | 322/58 |

FOREIGN PATENT DOCUMENTS

| JP | A 11-262299 | 9/1999 |
|---|---|---|
| JP | A 2000-032680 | 1/2000 |

* cited by examiner

*Primary Examiner*—Darren Schuberg
*Assistant Examiner*—Pedro J. Cuevas
(74) *Attorney, Agent, or Firm*—Oliff & Berridge, PLC

(57) ABSTRACT

The vehicle power-generation control unit has a first function enabled when a control signal received from outside designates a first mode to control an exciting current such that an output power of a vehicle generator is kept at a value specified by the control signal, a second function enabled when the control signal designates a second mode to control the exciting current such that a generation voltage of the vehicle generator is kept at a target voltage specified by the control signal, and a third function enabled when the control signal designates the first mode to monitor whether or not the generation voltage is in a predetermined voltage range and to disable the first function in order to control the exciting current such that the generation voltage is kept at a preset voltage upon detecting that the generation voltage is out of the predetermined voltage range.

8 Claims, 9 Drawing Sheets

| f | 100Hz | 200Hz |
|---|---|---|
| MODE | TARGET VOLTAGE SPECIFYING MODE | DUTY RATIO SPECIFYING MODE |

VEHICLE POWER-GENERATION CONTROL UNIT AND VEHICLE POWER-GENERATION CONTROL SYSTEM

CROSS-REFERENCE TO RELATED APPLICATION

This application is related to Japanese Patent Application No. 2004-300849 filed on Oct. 15, 2004, the contents of which are hereby incorporated by reference.

BACKGROUND OF THE INVENTION

1. Field of the Invention

The present invention relates to a vehicle power-generation control unit controlling a vehicle generator, and a vehicle power-generation control system including the vehicle power-generation control unit.

2. Description of Related Art

A vehicle generator is for charging a vehicle battery, and supplying electric power to electrical components of a vehicle such as an engine ignition device, lighting fixtures, and so on, thorough the vehicle battery. The vehicle generator is provided with a vehicle power-generation control unit for controlling the power generation by the vehicle generator to thereby keep the battery voltage in a predetermined voltage range regardless of load variation. As a technique for controlling the vehicle generator optimally depending on the running state of the vehicle, it is known to send a control value (target voltage or duty ratio of an exciting current, for example) reflecting the running state of the vehicle from an external device (engine control unit, for example) to the vehicle power-generation control unit.

A vehicle power-generation control unit utilizing such a technique is disclosed, for example, in Japanese Patent Application Laid-open No. 11-262299. This vehicle power-generation control unit is configured to detect the kind of a control value contained in a PWM signal sent from an ECU (Engine Control Unit) on the basis of a period of the PWM signal, and to set a control variable in accordance with a duty factor of the PWM signal. This vehicle power-generation control unit makes it possible to perform a sophisticated control, because it enables using a plurality of different control values.

It is also known to provide such a power-generation control unit with capability of protecting against break or short circuit of a cable running between the power-generation control unit and the ECU, as disclosed, for example, in Japanese Patent Application Laid-open No. 2000-32680. This vehicle power-generation control unit is configured to halt its control operation if the control value sent form the ECU does not change over a predetermined time period to avoid the vehicle generator from malfunctioning due to break or short circuit of the cable.

Incidentally, the recent ECUs include a software-based processor. Since the software used in these ECUs is large-scaled, it is not easy to completely remove bug in the software. If the vehicle power-generation control unit performs its control operation in accordance with the control value sent from the ECU operating on the software containing the bug, there is a possibility that the output voltage of the vehicle generator rises exceedingly high, thereby overcharging the vehicle battery and damaging electric components, or the output voltage of the vehicle generator falls exceedingly low, thereby causing malfunction of the electric components. Conventional vehicle power-generation control units including the ones disclosed in Japanese Patent Applications Laid-open No. 11-262299 and No. 2000-32680 have a problem in that they cannot protect against the software bug.

SUMMARY OF THE INVENTION

The present invention provides a vehicle power-generation control unit including:

an exciter circuit supplying an exciting current to a vehicle generator; and a control circuit controlling the exciting current;

the control circuit including:

a first function which is enabled when a control signal received from outside designates a first mode to control the exciting current such that an output power of the vehicle generator is kept at a value specified by the control signal;

a second function which is enabled when the control signal designates a second mode to control the exciting current such that a generation voltage of the vehicle generator is kept at a target voltage specified by the control signal; and a third function which is enabled when the control signal designates the first mode to monitor whether or not the generation voltage is in a predetermined voltage range and to disable the first function in order to control the exciting current such that the generation voltage is kept at a preset voltage upon detecting that the generation voltage is out of the predetermined voltage range.

With the present invention, it becomes possible to avoid the generation voltage of the vehicle generator from rising or falling beyond the normal voltage range even when the control signal sent from an external device(engine control unit, for example) to the vehicle power-generation control unit becomes abnormal.

PREFERRED EMBODIMENTS OF THE INVENTION

Figure 1:
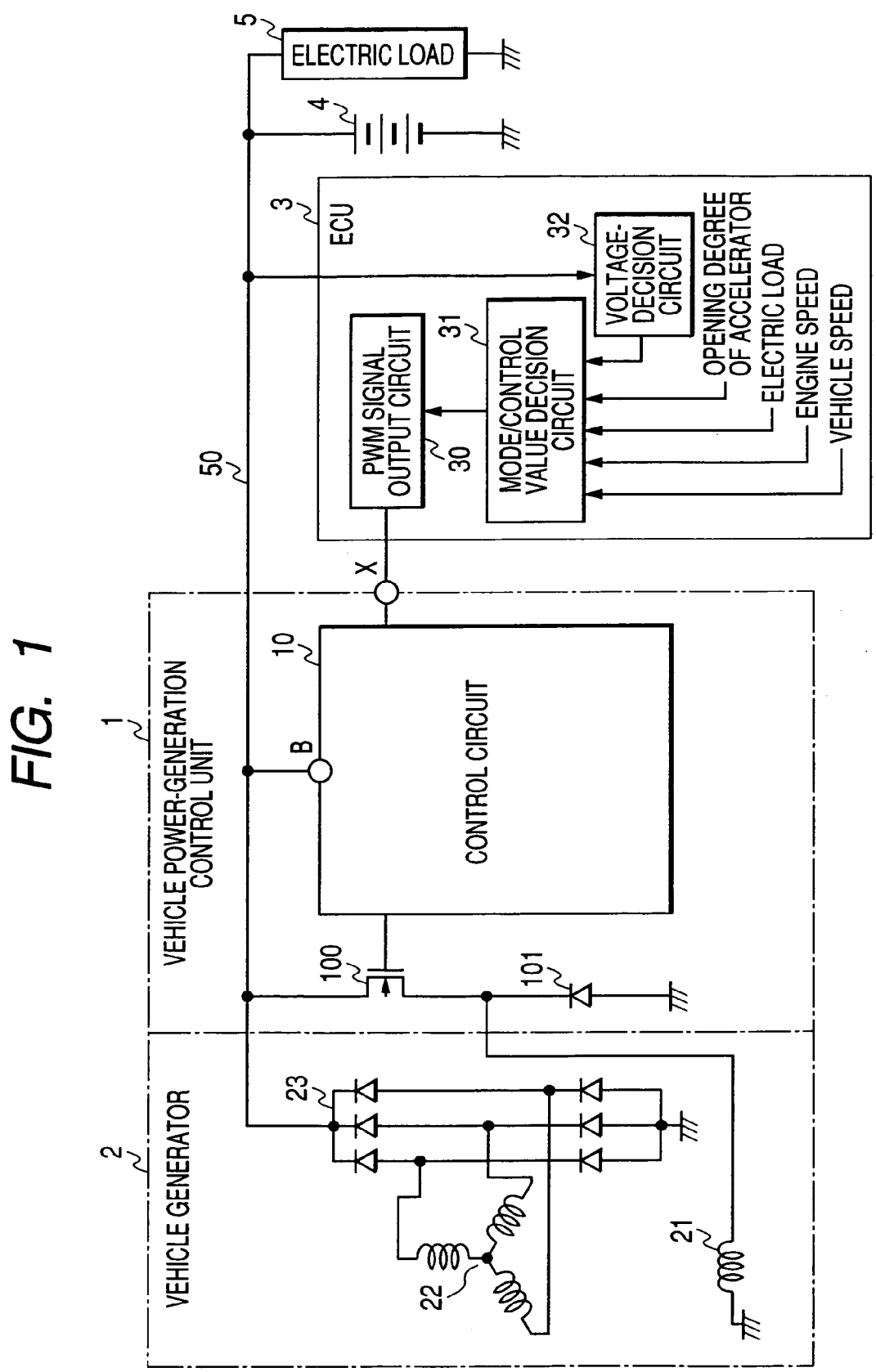
FIG. 1 is a diagram showing a configuration of a vehicle power-generation control system according to an embodiment of the invention.

FIG. 1 shows a configuration of a vehicle power-generation control system according to an embodiment of the invention. As shown in this figure, the vehicle power-generation control system includes a vehicle power-generation control unit 1, a vehicle generator 2, an ECU (Engine Control Unit) 3, and a battery 4. An electric load 5 is parallel-connected to the battery 4. The vehicle generator 2 is driven by a vehicle engine (not shown).

The vehicle generator 2 includes a rotor having an exciting winding 21, a stator having a three-phase stator winding 22, and a rectifier circuit 23 full-wave rectifying the three-phase output of the stator winding 22. An output terminal (not shown) of the vehicle generator 2 is connected to the vehicle power-generation control unit 1, ECU 3, and battery 4 through a high-side line 50. The output power of the vehicle generator 2 is adjustable by controlling the exciting current flowing through the exciting winding 21.

The vehicle power-generation control unit 1, which is for controlling the exciting current flowing through the exciting winding 21, includes a MOSFET100, a free-wheel diode 101, and a control circuit 10. The MOSFET 100 and the free-wheel diode 101 constitute an exciter circuit for the vehicle generator 2. The MOSFET 100 and the exciting winding 21 are connected in series between the high-side line 50 and the ground. The MOSFET 100 is PWM-controlled by the control circuit 10 to control the exciting current flowing through the exciting winding 21. The free-wheel diode 101 parallel-connected to the exciting winding 21 is for allowing a current, which is caused by a high voltage induced across the exciting winding 21 when the MOSFET 100 is turned off, to pass.

The ECU 3 includes a PWM signal output circuit 30, a mode/control value determination circuit 31, and a voltage-decision circuit 32. The ECU 3 operates on software (control program) which is stored in a ROM or RAM and executed by a processor included in the ECU 3.

The voltage-decision circuit 32 decides whether or not a voltage of the high-side line 50 (referred to as a generation voltage hereinafter) is within a predetermined normal voltage range. The generation voltage depends on the output voltage of the vehicle generator 2 and the voltage of the battery 4 (referred to as the battery voltage hereinafter). The mode/control value determination circuit 31 determines one of predetermined control modes and a control value as directions to be given to the vehicle power-generation control unit 1 on the basis of vehicle-state information including a vehicle speed, an engine speed, an opening degree of an accelerator, etc. The PWM signal control circuit 30 outputs, as a control signal, a PWM signal having a frequency corresponding to the determined control mode, and a duty factor corresponding to the determined control value to the vehicle power-generation control unit 1.

Figures 2, 3:
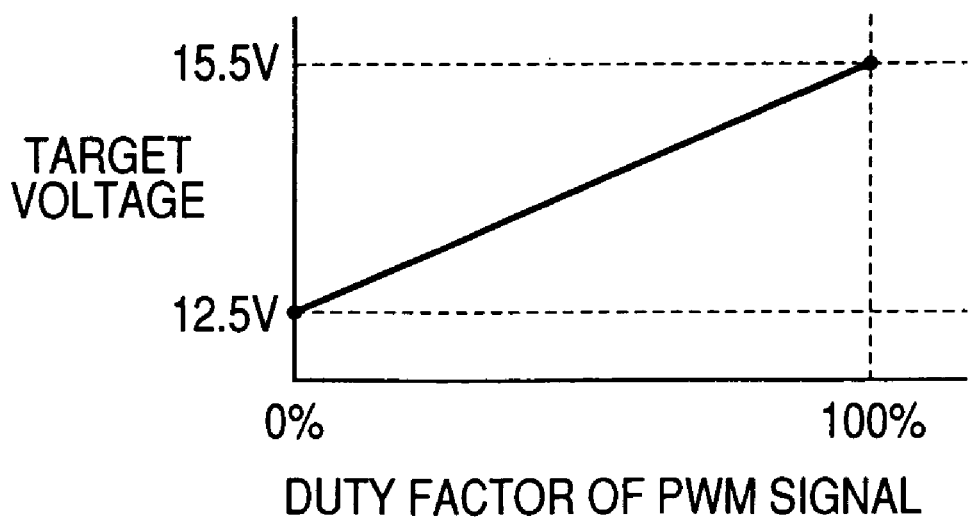
FIG. 2 is a table showing a relationship between control modes of a vehicle power-generation control unit included in the vehicle power-generation control system and frequencies of a PWM signal sent from engine control unit to the vehicle power-generation control unit.
FIG. 3 is a graph showing a relationship between the magnitude of a target voltage and the duty factor of the PWM signal in a target voltage specifying mode.

FIG. 2 is a table showing a relationship between the control modes and the frequencies of the PWM signal. In this embodiment, the control mode includes a target voltage specifying mode and a duty ratio specifying mode. As shown in this table, to designate the target voltage specifying mode, the frequency of the PWM signal is set at 100 Hz. In this target voltage specifying mode, the magnitude of the target voltage is specified by the duty factor of the PWM signal. FIG. 3 is a graph showing a relationship between the magnitude of the target voltage and the duty factor of the PWM signal when the target voltage specifying mode is designated.

As shown in this graph, in this embodiment, when the duty factor of the PWM signal increases from 0% to 100%, the specified magnitude of the target voltage increases from 12.5V to 15.5V linearly.

On the other hand, to designate the duty ratio specifying mode, the frequency of the PWM signal is set at 200 Hz. In this duty ratio specifying mode, the duty ratio at which the MOSFET 100 operates is specified by the duty factor of the PWM signal.

It is desirable that the ratio of the frequency of the PWM signal to designate the target voltage specifying mode to the frequency of the PWM signal to designate the duty ratio specifying mode is a power of 2 to simplify digital processing in the system. It is possible to use a pulse train signal containing codes specifying the target voltage and the control mode instead of the PWM signal.

Figure 4:
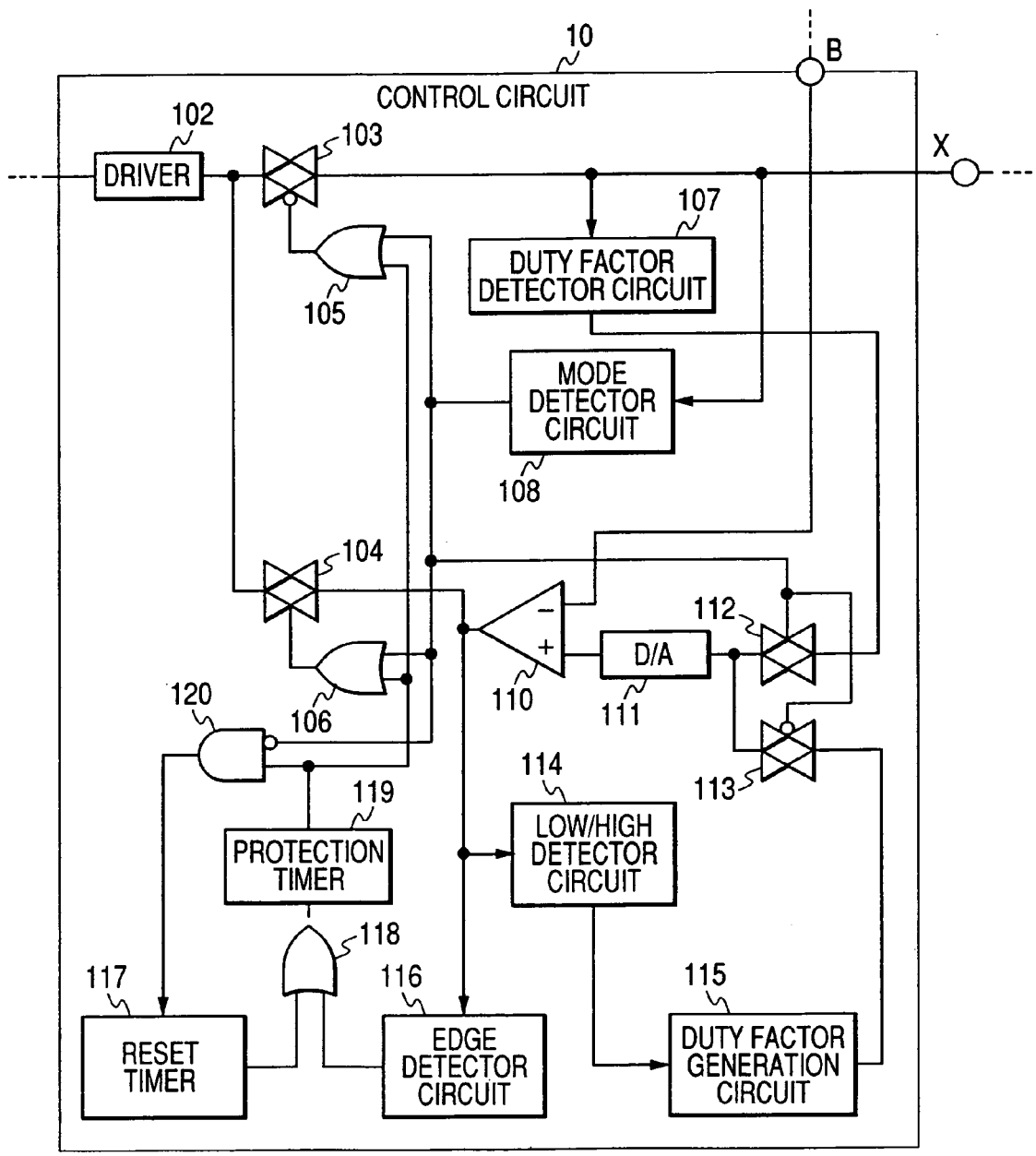
FIG. 4 is a circuit diagram of a control circuit included in the vehicle power-generation control unit.

FIG. 4 shows a circuit configuration of the control circuit 10. As shown in this figure, the control circuit 10 includes a driver 102, analog switches 103, 104, 112, 113, OR circuits 105, 106, 118, a duty factor detector circuit 107, a mode detector circuit 108, a voltage comparator 110, a digital analog converter (D/A converter) 111, a low/high detector circuit 114, a duty factor generation circuit 115, an edge detector 116, a return timer 117, a protection timer 119, and an AND circuit 120.

The drive 102 is for on/off driving the MOSFET 100 in accordance with a drive signal received from one of the analog switches 103, 104 constituting a selector. The duty factor detector circuit 107 is for detecting the duty factor of the PWM signal supplied from the ECU 3, and outputting a digital signal representing the detected duty factor. The mode detector circuit 108 is for detecting which of the target voltage specifying mode and the duty ratio specifying mode is designated on the basis of the frequency of the PWM signal. The output of the mode detector circuit 108 becomes high when it detects that the target voltage specifying mode is designated, while becomes low when it detects that the duty ratio specifying mode is designated. The low/high detector circuit 114 is for detecting whether a comparison signal outputted from the voltage comparator 110 is in the low level state or high level state. The duty factor generation circuit 115 outputs a digital signal representing 100% of the duty factor when it detects that the comparison signal is in the low level state, while outputs a digital signal representing 0% of the duty factor when it detects that the comparison signal is in the high level state. The edge detector circuit 116 detects an edge of the comparison signal appearing when the comparison signal changes from the low level state to the high level state, and vice versa, and outputs a low level pulse signal each time it detects the edge. The protection timer 119, which may be an up counter, starts up-counting operation upon receiving the low-level pulse signal, and when the count value thereof has increased to a predetermined value, changes its output from the low-level state to the high-level state. The return timer 117, which may be a down counter, starts down-count operation upon receiving a high level signal from the AND circuit 120, and when the count value thereof has reduced to a predetermined value, changes its output from the high level state to the low level state.

Next, the operation of the vehicle power-generation control unit 1 is explained below.

Target Voltage Specifying Mode

In a case where the frequency of the PWM signal is 100 Hz, that is, where the target voltage specifying mode is designated, the mode detector circuit 108 supplies a high level signal to the OR circuits 105, 106 and the analog switches 112, 113. In this case, since the OR circuit 105 applies a high level signal to the inverting control terminal of the analog switch 103, and the OR circuit 106 applies a high level signal to the non-inverting control terminal of the analog switch 104, the driver 102 receives a signal passing through the analog switch 104 as the drive signal.

Also, in this case, since the analog switch 112 is applied with the high level signal at its non-inverting control terminal, while the analog switch 113 is applied with the high level signal at its inverting control terminal, the DA converter 111 receives the digital signal representing the duty factor of the PWM signal outputted from the duty factor detector circuit 107 and passing through the analog switch 112. The DA converter 111 converts this digital signal into the target voltage in accordance with the conversion characteristic shown in the graph of FIG. 3.

The voltage comparator 110 compares the target voltage outputted from the DA converter 111 with the generation voltage (the voltage of the high-side line 50). The MOSFET 100 is on/off driven in accordance with the comparison results. More specifically, when the generation voltage is lower than the target voltage, the voltage comparator 110 outputs a high level signal. This high level signal is inputted to the driver 102 as the drive signal through the analog switch 104, as a result of which, the MOSFET 100 is turned on (that is, the MOSFET 100 becomes conductive) to allow the exciting current to flow through the exciting winding 21 to thereby raise the output voltage of the vehicle generator 2. On the other hand, when the generation voltage is higher than the target voltage, the voltage comparator 110 outputs a low level signal. This low level signal is inputted to the driver 102 as the drive signal through the analog switch 104, as a result of which, the MOSFET is turned off to inhibit the exciting current from flowing through the exciting winding 21 to thereby lower the output voltage of the vehicle generator 2. Thus, the generation voltage (battery voltage) is controlled at the target voltage represented by the duty factor of the PWM signal sent from the ECU 3.

Duty Ratio Specifying Mode

In a case where the frequency of the PWM signal is 200 Hz, that is, where the duty ratio specifying mode is designated, the mode detector circuit 108 supplies a low level signal to the OR circuits 105, 106 and the analog switches 112, 113. In this case, since the OR circuit 105 applies a low level signal to the inverting control terminal of the analog switch 103, and the OR circuit 106 applies a low level signal to the non-inverting control terminal of the analog switch 104, the driver 102 receives the PWM signal passing through the analog switch 103 as the drive signal. Accordingly, the MOSFET 100 is on/off driven with the duty ratio represented by the duty factor of the PWM signal sent from the ECU 3 to thereby control the output power of the vehicle generator 2.

Figure 5:
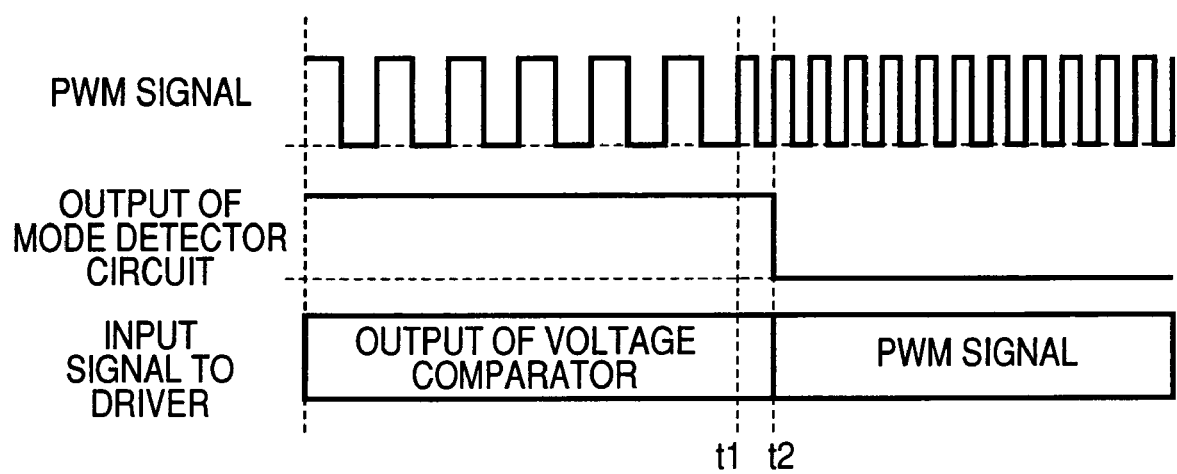
FIG. 5 is a waveform diagram for explaining the operation of the vehicle power-generation control unit when the frequency of the PWM signal is changed to switch the control mode from the target voltage specifying mode to the duty ratio specifying mode.

Next, the operation of the vehicle power-generation control unit 1 when the frequency of the PWM signal is switched is explained with reference to FIG. 5. Here, it is assumed that the mode detector circuit 108 needs one cycle of the PWM signal to detect the frequency of the PWM signal. As shown in FIG. 5, while the frequency of the PWM signal is 100 Hz (while the target voltage specifying mode is designated), the mode detector circuit 108 outputs the high level signal, so that the driver 102 receives, through the analog switch 104, the comparison signal outputted from the voltage comparator 110 as the drive signal. When the frequency of the PWM signal is switched to 200 Hz (when the duty ratio specifying mode is designated) at time t1, the mode detector circuit 108 detects that the frequency of the PWM signal has been changed to 200 Hz at the end of the first cycle of the PWM signal (time t2) after this frequency switching, and outputs the low level signal from the next cycle onward, so that driver 102 receives, through the analog switch 103, the PWM signal itself as the drive signal.

In this embodiment, the ECU 3 is configured to designate the duty ratio specifying mode while the generation voltage (battery voltage) is detected to be in the predetermined normal voltage range (between 12.5V and 15.5V, for example) by the voltage decision circuit 32 in order to control the output power of the vehicle generator 2 in accordance with the vehicle state information including the vehicle speed, engine speed, etc., and to designate the target voltage specifying mode when the generation voltage goes out of the normal voltage range in order to put the generation voltage in the normal voltage range through feedback control.

As explained below in detail, the vehicle power-generation control unit 1 can protect against abnormality in the PWM signal sent from the ECU 3, which may be caused by software bug, when the vehicle power-generation control unit 1 is operating on the duty ratio specifying mode by use of the voltage comparator 110.

Figure 6:
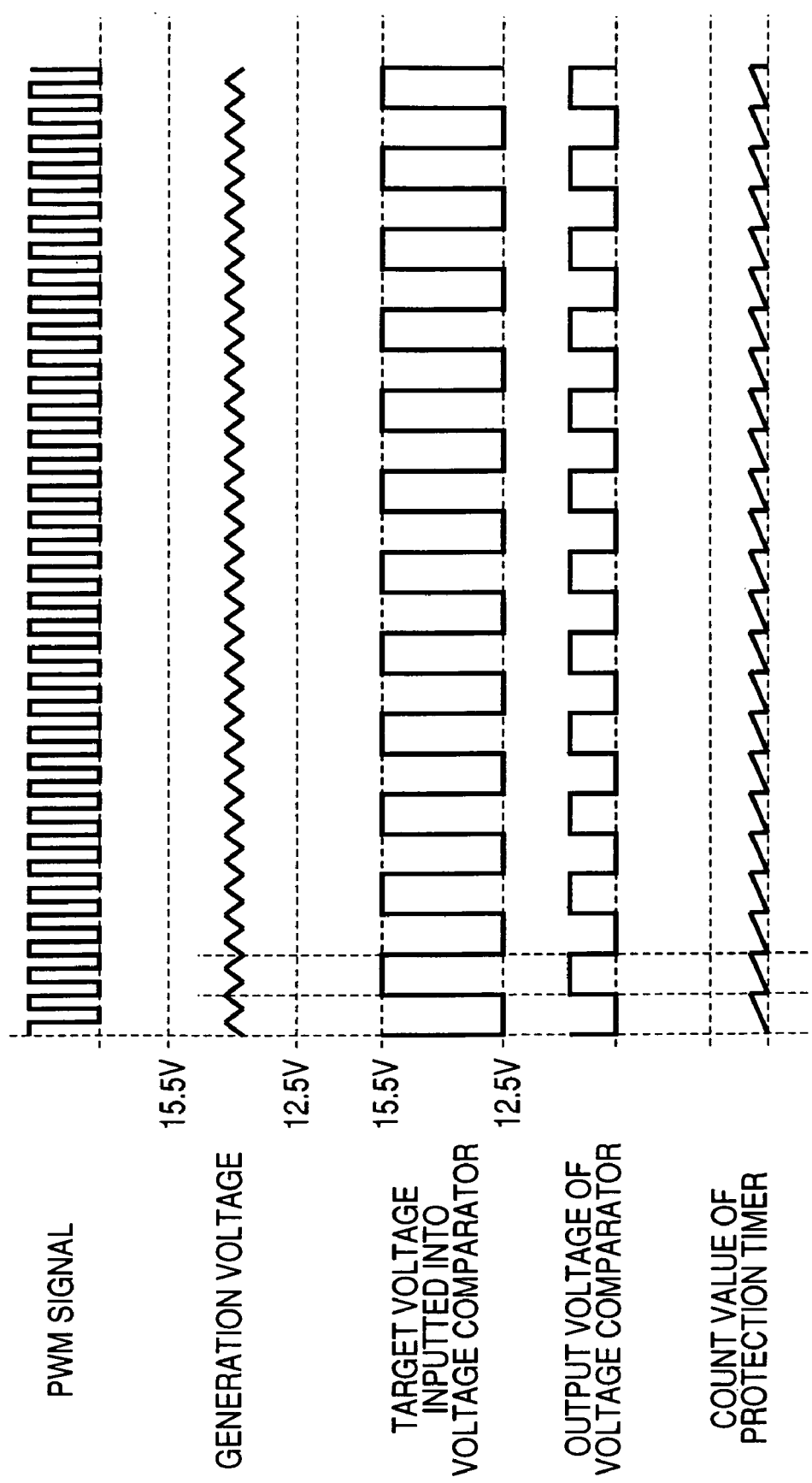
FIG. 6 is a waveform diagram for explaining the operation of the vehicle power-generation control unit in the duty ratio specifying mode when the generation voltage is in a normal voltage range.

First, explanation is made as to the case where the PWM signal sent from the ECU 3 is normal with reference to FIG. 6.

In the duty ratio specifying mode, since the mode detector circuit 108 outputs the low level signal, the analog switch 113 is enabled, while the analog switch 112 is disabled. Accordingly, as is evident from the following explanation, the D/A converter 111 receives the digital signal representing 100% of the duty factor and the digital signal representing 0% of the duty factor alternately, and the D/A converter 111 therefore outputs 12.5V and 15.5V alternately as the target voltage as shown in FIG. 6. It should be noted that digital signals representing values other than 100% and 0% may be supplied alternately to the D/A converter 111. If the normal voltage range is between 12.5V and 15.5V, the generation voltage is always higher than the target voltage when the A/D converter 111 outputs 12.5V, and is always lower than the target voltage when the A/D converter 111 outputs 15.5V, as long as the vehicle power-generation control system is in the normal state. It means that the comparison signal outputted from the voltage comparator 110 oscillates between the low level and high level when the vehicle power-generation control unit 1 is operating on the duty ratio specifying mode. The comparison signal oscillating between the low level and high level is inputted to the low/high detector circuit 114, and the detection results are supplied to the duty factor generation circuit 115. In consequence, the duty factor generation circuit 115 outputs the digital signal representing 100% of the duty factor and the digital signal representing 0% of the duty factor alternately, which are received by the D/A converter 111 through the analog switch 113. The comparison signal oscillating between the low level and high level is also inputted to the edge detector 116. The edge detector circuit 116 outputs the high level pulse each time the level of the comparison signal is inverted to thereby reset the protection timer 119.

Figure 7:
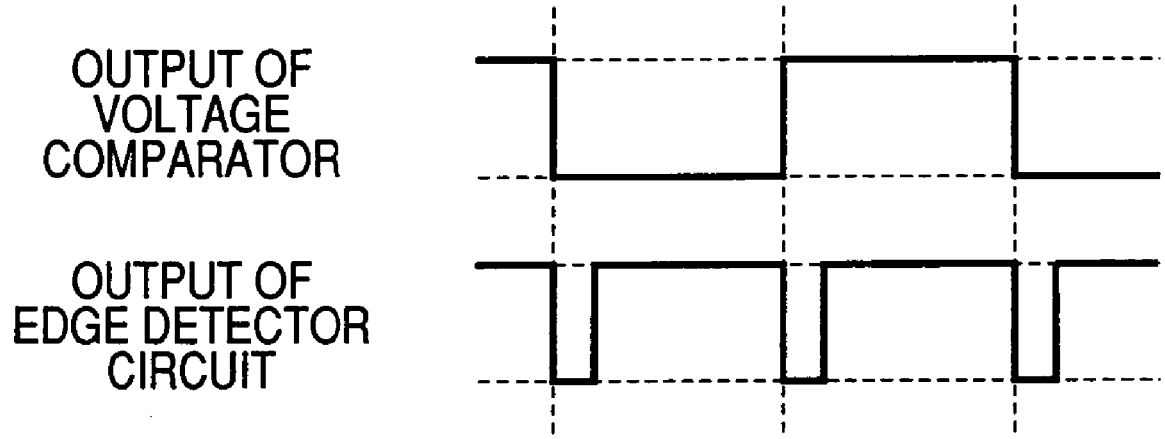
FIG. 7 is a waveform diagram for explaining the operation of a protection timer included in the vehicle power-generation control unit in the duty ratio specifying mode when the generation voltage is in the normal voltage range.

FIG. 7 shows waveforms of the comparison signal outputted from the voltage comparator 110 and the pulse signal outputted from the edge detector circuit 116 when the PWM signal sent from the ECU 3 is normal. As explained above, since the comparison signal outputted from the voltage comparator 110 oscillates between the high and low levels, and the edge detector circuit 116 outputs the low level pulse each time the level of the comparison signal is inverted, the protection timer 119 is reset periodically and the output of the protection times 119 is kept unchanged at the low level.

In this embodiment, since the voltage comparator 110 which is used for comparing the generation voltage with the target voltage in the target voltage specifying mode is also used for monitoring the generation voltage and producing the oscillated comparison signal in the duty ratio specifying mode as long as the generation voltage is in the normal voltage range, the circuit scale of the vehicle power-generation control unit 1 can be made small.

Figure 8:
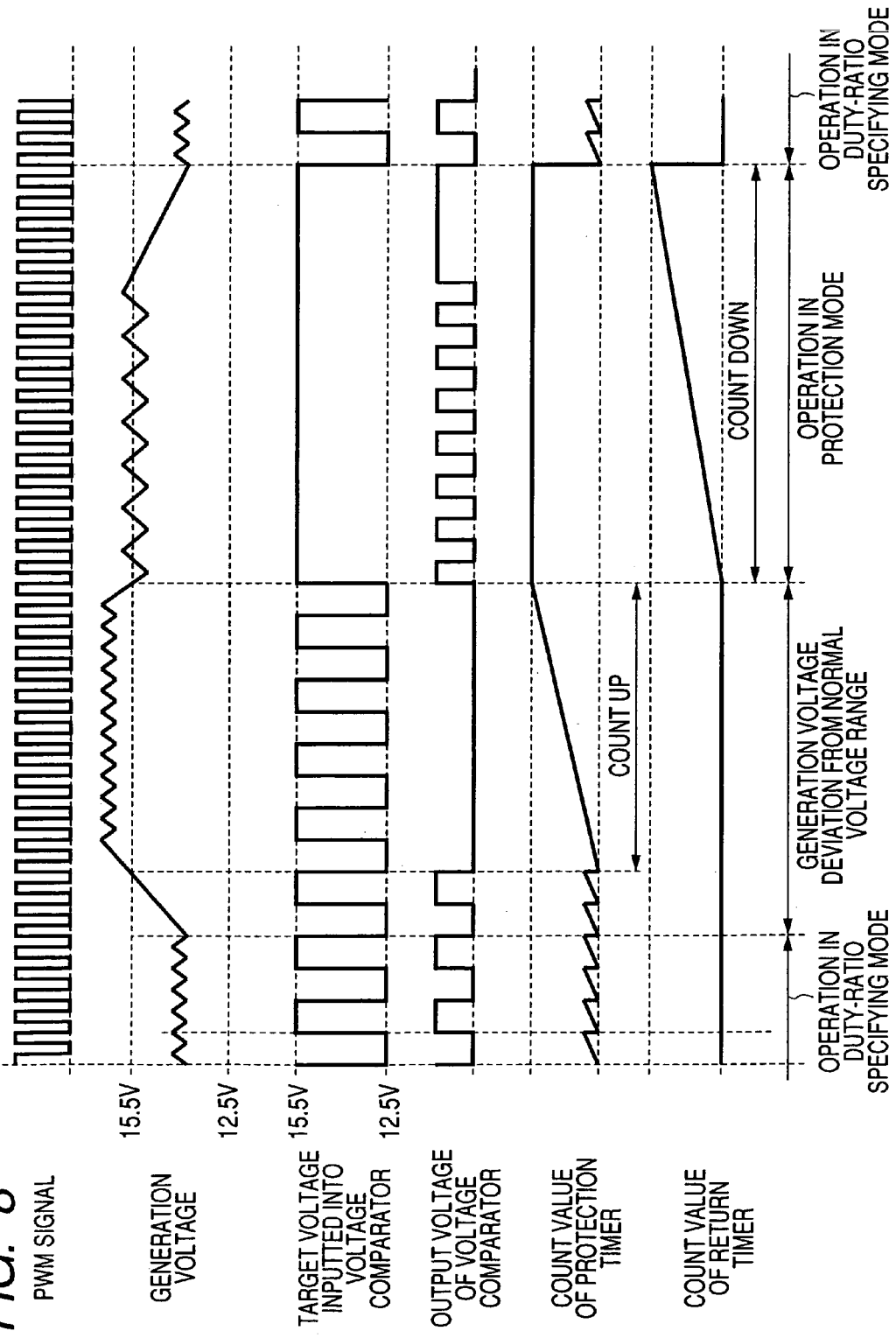
FIG. 8 is waveform diagram for explaining the operation of the vehicle power-generation control unit in the duty ratio specifying mode when the generation voltage rises beyond an upper limit of the noraml voltage range.

Next, explanation is made as to the case where the duty factor of the PWM signal sent from the ECU 3 becomes excessively high due to software bug, and as a result, the generation voltage (battery voltage) rises beyond the upper limit of the normal voltage range with reference to FIG. 8.

When the generation voltage becomes higher than the upper limit (15.5V, for example), the output of the voltage comparator 110 is fixed at the low level.

In this case, since the edge detector circuit 116 does not output the low level pulse, the periodical reset of the protection timer 119 does not occur. In consequence, the protection timer 119 outputs the high level signal after a lapse of a predetermined time (desirably, twice the excitation time constant (response time) of the vehicle generator 2) from the time at which the protection timer 119 was last reset. As a result, the analog switch 104 is enabled, while the analog switch 103 is disabled. Thus, the MOSFET 100 is on/off driven in accordance with the output of the voltage comparator 110.

Incidentally, while the output of the voltage comparator 110 is fixed at the low level, the duty factor generation circuit 115 outputs the digital signal representing 100% of the duty factor in accordance with the low/high detection result received from the low/high detector circuit 114. As a result, the D/A converter 111 outputs 15.5V as the target voltage when the generation voltage becomes higher than the upper limit. Hence, in this embodiment, when the generation voltage is being controlled near the upper limit (15.5V, for example), even if the ECU 3 erroneously sends the PWM signal having a duty factor higher than an appropriate value not by software bug but by ground potential difference between the ECU 3 and the vehicle power-generation control unit 1, thereby activating the protection timer 119, the generation voltage can be kept near an expected value (near the upper limit).

Figure 9:
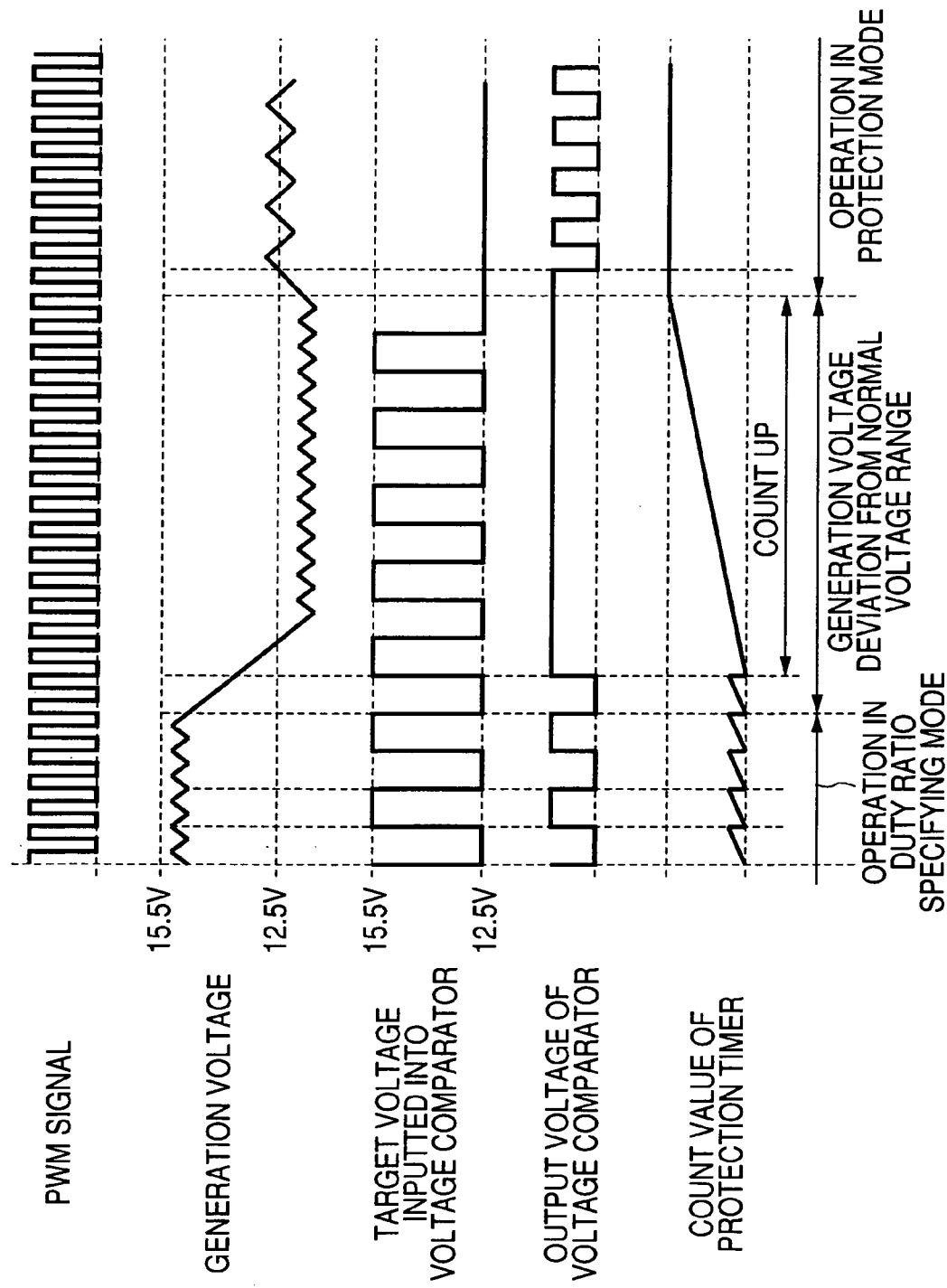
FIG. 9 is waveform diagram for explaining the operation of the vehicle power-generation control unit in the duty ratio specifying mode when the generation voltage falls beyond a lower limit of the noraml voltage range.

Next, explanation is made as to the case where the duty factor of the PWM signal sent from the ECU 3 becomes excessively low due to software bug, and as a result, the generation voltage (battery voltage) falls beyond the lower limit of the normal voltage range with reference to FIG. 9.

When the generation voltage becomes lower than the lower limit (12.5V, for example), the output of the voltage comparator 110 is fixed at the high level. In this case, since the edge detector circuit 116 does not output the low level pulse, the periodical reset of the protection timer 119 does not occur. In consequence, the protection timer 119 outputs the high level signal after a lapse of the predetermined time from the time at which the protection timer 119 was last reset. As a result, the analog switch 104 is enabled, while the analog switch 103 is disabled. Thus, the MOSFET 100 is on/off driven in accordance with the output of the voltage comparator 110.

Incidentally, while the output of the voltage comparator 110 is fixed at the high level, the duty factor generation circuit 115 outputs the digital signal representing 0% of the duty factor in accordance with the low/high detection result received from the low/high detector circuit 114. As a result, the D/A converter 111 outputs 12.5V as the target voltage when the generation voltage becomes lower than the lower limit. Hence, in this embodiment, when the generation voltage is being controlled near the lower limit (12.5V, for example), even if the ECU 3 erroneously sends the PWM signal having a duty factor lower than an appropriate value not by software bug but by the power line voltage difference between the ECU 3 and the vehicle power-generation control unit 1, thereby activating the protection timer 119, the generation voltage can be kept near an expected value (near the lower limit).

Figure 10:
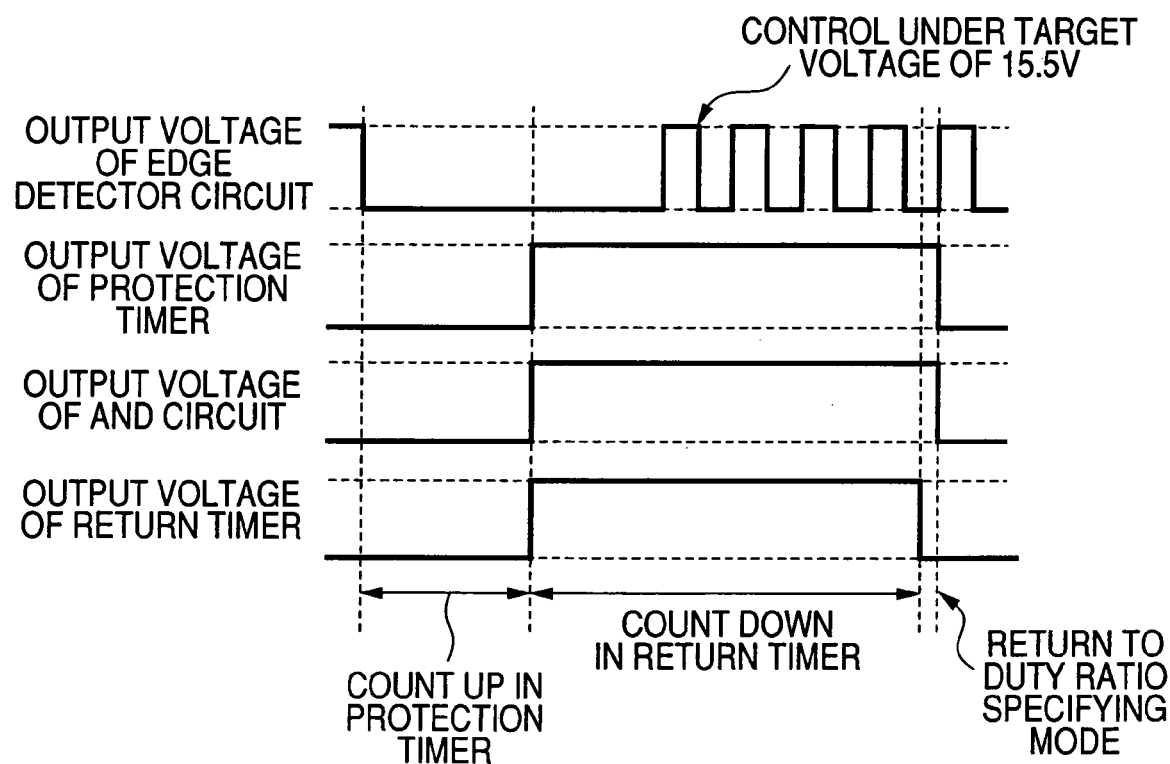
FIG. 10 is a waveform diagram for explaining the operation of a reset timer included in the vehicle power-generation control unit when the vehicle power-generation control unit returns to the duty ratio specifying mode from a protection mode.

The reset timer 117 is for returning the vehicle power-generation control unit 1 from the protection mode (the target voltage specifying mode initiated by the activation of the protection timer 119) to the duty ratio specifying mode. The operation of the reset timer 117 is explained below with reference to FIG. 10 showing waveforms of the outputs of the edge detector circuit 116, protection timer 119, AND circuit 120, and reset timer 117.

As explained above, if the edge detector circuit 116 does not detect any edge in the comparison signal outputted from the voltage comparator 110 after the mode detector circuit 108 detects that the duty ratio specifying mode is designated, and as a result, the protection timer 119 is activated to output the high level signal, the AND circuit 120 outputs the high level signal. Inconsequence, the reset timer 117 starts the down count from a preset value, so that the output of the reset timer 117 changes form the high level to the low level after a lapse of a certain time from the time at which the protection timer 119 was activated. Assume that the generation voltage has returned to within the normal voltage range after the protection timer 119 was activated as a consequence of the switch to the protection mode. In this case, if the output of the reset timer 117 has been changed form the high level to the low level, the protection timer 119 is reset, because the voltage comparator 110 is outputting the oscillated comparison signal, and the edge detector circuit 116 is therefore outputting the low level pulses then. If the protection timer 119 is reset, the output of the AND circuit 120 becomes low, and the reset timer 117 is therefore reset.

As explained above, the reset timer 117 ensures the vehicle power-generation control unit 1 to return to the duty ratio specifying mode from the protection mode when the PWM signal becomes abnormal only temporarily, so that the vehicle generator 2 is controlled optimally in accordance with the vehicle state and power consuming state of electric loads.

With the present embodiment, it is possible to avoid the generation voltage from going out of the normal voltage range even when the PWM signal sent from the ECU 3 becomes abnormal. It should be noted that, since the vehicle power-generation control unit 1 switches from the duty ratio specifying mode to the protection mode only when the time period during which the generation voltage is out of the normal voltage range exceeds a certain time, the power-generation control unit 1 can be avoided from unnecessarily switching to the protection mode when the output voltage of the vehicle generator 2 momentarily changes. The time period is preferably about twice the excitation time constant (response time) of the vehicle generator 2.

It should be also noted that when the generation voltage is controlled near the upper limit (or lower limit), even if the ECU 3 erroneously sends the PWM signal having a duty factor higher (or lower) than an appropriate value, and accordingly the vehicle power-generation control unit 1 switches to the protection mode, the generation voltage can be kept near an expected value, since the target voltage is set at the upper limit (or lower limit) of the normal voltage range then.

Although the present embodiment uses the protection timer 119 and the reset timer 117, a single counter in which a plurality of different count values are separately settable may be used instead of these two counters.

The above explained preferred embodiments are exemplary of the invention of the present application which is described solely by the claims appended below. It should be understood that modifications of the preferred embodiments may be made as would occur to one of skill in the art.

What is claimed is:

1. A vehicle power-generation control unit comprising:
    an exciter circuit supplying an exciting current to a vehicle generator; and
    a control circuit controlling said exciting current;
    said control circuit including:
    a first function which is enabled when a control signal received from outside designates a first mode to control said exciting current such that an output power of said vehicle generator is kept at a value specified by said control signal;
    a second function which is enabled when said control signal designates a second mode to control said exciting current such that a generation voltage of said vehicle generator is kept at a target voltage specified by said control signal; and
    a third function which is enabled when said control signal designates said first mode to monitor whether or not said generation voltage is in a predetermined voltage range and to disable said first function in order to control said exciting current such that said generation voltage is kept at a preset voltage upon detecting that said generation voltage is out of said predetermined voltage range.

2. The vehicle power-generation control unit according to claim 1, wherein said third function is configured to disable said first function when a time period over which said generation voltage is detected to be out of said predetermined voltage range exceeds a predetermined time.

3. The vehicle power-generation control unit according to claim 2, wherein said predetermined time is substantially equal to twice an excitation time constant of said vehicle generator.

4. The vehicle power-generation control unit according to claim 1, wherein said preset voltage is equal to one of an upper limit and a lower limit of said predetermined voltage range.

5. The vehicle power-generation control unit according to claim 1, wherein said exciter circuit includes a switching element connected between said generation voltage and an exciting winding of said vehicle generator, and said control circuit includes a voltage comparator,
said second function being configured to perform comparison between said target voltage and said generation voltage by use of said voltage comparator, and to control conductivity of said switching element in accordance with a result of said comparison.

6. The vehicle power-generation control unit according to claim 5, wherein said third function is configured to perform, by use of said voltage comparator, a comparison between said generation voltage and a voltage having one of two predetermined different values determined depending on which of a high level and a low level an output voltage of said voltage comparator has while said control signal designates said first mode, and configured to determine that said generation voltage is out of said predetermined voltage range if said output voltage of said voltage comparator is kept unchanged at one of said high and low levels.

7. The vehicle power-generation control unit according to claim 6, wherein said control circuit includes a fourth function of disabling said third function and enabling said first function upon detecting return of said generation voltage into within said predetermined voltage range on the basis of said output voltage of said voltage comparator while said control signal designates said first mode.

8. A vehicle power-generation control system including first and second control units,
    said first control unit comprising:
    an exciter circuit supplying an exciting current to a vehicle generator; and
    a control circuit controlling said exciting current;
    said control circuit including:
    a first function which is enabled when a control signal received from said second control unit designates a first mode to control said exciting current such that an output power of said vehicle generator is kept at a value specified by said control signal;
    a second function which is enabled when said control signal designates a second mode to control said exciting current such that a generation voltage of said vehicle generator is kept at a target voltage specified by said control signal; and
    a third function which is enabled when said control signal designates said first mode to monitor whether or not said generation voltage is in a first predetermined voltage range, and to disable said first function in order to control said exciting current such that said generation voltage is kept at a preset voltage upon detecting that said generation voltage is out of said first predetermined voltage range,
    said second control unit comprising:
    a first circuit monitoring whether or not said generation voltage is in a second predetermined voltage range; and
    a second circuit producing said control signal,
    said control signal designating said first mode when said first circuit detects that said generation voltage is in said second predetermined voltage range, and designating said second mode when said first circuit detects that said generation voltage is out of said second predetermined voltage range.

* * * * *